Patented June 5, 1951

2,555,551

UNITED STATES PATENT OFFICE 2,555,551

COPOLYMERS OF p-ISOPROPENYL TOLUENE AND UNSATURATED ALKYD RESINS

Edward L. Kropa, Old Greenwich, Conn., assignor to American Cyanamid Company, New York, N. Y., a corporation of Maine No Drawing. Application March 19, 1947, Serial No. 735,801

5 Claims. (Cl. 260—45.4)

This invention relates to polymerizable compositions, to insoluble resins prepared therefrom and to processes for polymerizing such compositions to produce such insoluble resins.

p-Isopropenyl toluene, unlike other unsaturated materials, does not itself polymerize readily and extremely active catalysts are generally required to effect polymerization of this substance. Except under very special conditions and with special catalysts, low molecular weight polymers which are soluble in aromatic hydrocarbon solvents such as benzene, toluene, xylene, etc., are formed. Moreover, if copolymerized with an ester of an alpha,beta-unsaturated dicarboxylic acid and a monohydric alcohol, a similarly soluble product of relatively low molecular weight is obtained.

It is an object of the present invention to prepare copolymers of p-isopropenyl toluene which are insoluble in solvents such as those of the aromatic hydrocarbon type.

Another object of the present invention is the preparation of insoluble polymeric materials of high molecular weight.

A further object of the present invention is to provide a means for activating the polymerization of p-isopropenyl toluene.

It is an additional object of the present invention to provide a process for the copolymerization of p-isopropenyl toluene with another polymerizable compound to form a high molecular weight polymer which is insoluble in organic solvents such as those of the aromatic hydrocarbon type.

Another object of the present invention is the preparation of polymerizable compositions especially suited for casting.

These and other objects are attained by bringing about copolymerization of p-isopropenyl toluene with a glycol ester of an alpha,beta-unsaturated dicarboxylic acid. Conversely, therefore, it is an object of the present invention to provide a new and advantageous curing agent, i. e., p-isopropenyl toluene for unsaturated alkyd resins which are glycol esters of alpha,beta-unsaturated dicarboxylic acids.

The invention will be described in greater detail in conjunction with the following specific examples in which proportions are given in parts by weight. It should be understood that the examples are merely illustrative and that the scope of the invention should not be limited to the details therein set forth.

EXAMPLE 1

Part A 75 parts of dipropylene glycol maleate
25 parts of p-isopropenyl toluene
0.2 part of benzoyl peroxide The peroxide is dissolved in the p-isopropenyl toluene and the mixture added to the dipropylene glycol maleate which has been preheated to about 90° C. A homogeneous solution which will be referred to as A occurs readily.

Part B 75 parts of dipropylene glycol maleate
25 parts of p-isopropenyl toluene The p-isopropenyl toluene is dissolved in the dipropylene glycol maleate which has been preheated to about 90° C. A homogeneous solution which will be referred to as B readily occurs.

Small portions of A and B are heated at 140° C. for 24 hours. Hardening occurs and the resulting resins are clear, insoluble and infusible. Solution A containing the peroxide catalyst does not exhibit a very marked increase in polymerization rate as compared with solution B which contains no peroxide catalyst.

Rockwell hardness measurements are made on the insoluble resins obtained. The values obtained on the surfaces of resins A and B are 62 and 63 (M-scale), respectively, whereas the interior of the resins had values of 62—63 and 66, respectively, indicating a proper through-cure. Resin A is only slightly harder than resin B.

Additional portions of solutions A and B are allowed to stand at room temperature and the following observations are made:

| Time | A | B |
|---|---|---|
| 24 hours | thickened | gelled. |
| 48 hours | gelled | Do. |
| 2 weeks | case hardened | case hardened. |
| 1 month | harder product | harder product. |

After two weeks, the products can still be removed from the containers. The resins are case hardened, i. e., slight pressure causes the resinous composition to yield but when pressure is removed the surface is restored. If the resin in the case hardened stage is allowed to stand at room temperature it becomes harder as time goes on and does not craze.

It will be noted that the peroxide catalyst exerts a slight inhibiting action at first.

EXAMPLE 2

70 parts of dipropylene glycol maleate
30 parts of p-isopropenyl toluene
0.2 part of benzoyl peroxide A solution of the above ingredients is prepared in accordance with Example 1. The resulting resinous mass is cast in the form of a sheet between glass plates to 60° C. for 6 days. At the end of this time the resin is case hardened and can be removed from the mold. While the resin is fragile, it can be bent. It is further cured in a bent form in the absence of air at 120° C. for 4 days. The finished cured resin has taken up the curvature initially imposed upon it.

Physical properties of the cast sheet are determined. Average values are as follows: bending strength 620 kgms./cm., impact strength 15.1 cm. kgms./sq. cm. and Rockwell hardness (M-scale) 65.5.

EXAMPLE 3

Molecular proportions of 1,3-butylene glycol and fumaric acid are heated together for 16.5 hours at 160° C. and for 5.5 hours at 170° C. The resin obtained has an acid number of 51.

Molecular proportions of 1,3-butylene glycol and maleic anhydride are heated together for 18 hours at 145° C., 7 hours at 160° C. and 8 hours at 170° C. The resin obtained has an acid number of 42.

Each of the resins is dissolved in p-isopropenyl toluene in various proportions and the viscosity of the solutions determined:

| Resin, Parts | p-Isopropenyl Toluene, Parts | Gardner Holdt Viscosity | |
|---|---|---|---|
| | | Maleic Resin | Fumaric Resin |
| 70 | 30 | Y-Z | Z6 |
| 65 | 35 | V-W | Z5 |
| 60 | 40 | Q-R | Z1 |
| 50 | 50 | Incompatible, no solutions formed. | |

EXAMPLE 4

70 parts of butylene glycol fumarate
30 parts of p-isopropenyl toluene
0.25 part of lauroyl peroxide A solution of the above ingredients, prepared as described in Example 1, sets to a stiff gel at 120° C. in 1.5 hours. Further heating at this temperature results in hardening of the resin.

EXAMPLE 5

70 parts of butylene glycol fumarate
30 parts of p-isopropenyl toluene

A solution of the above ingredients, prepared as described in Example 1, cures hard in 24 hours at 140° C.

EXAMPLE 6

A solution prepared according to Example 1 and containing 70 parts of dipropylene glycol fumarate and 30 parts of p-isopropenyl toluene is used to impregnate paper. The paper is allowed to drain and the impregnated sheets are assembled to the desired thickness and heated under a moderate pressure. Curing takes place by polymerization, not through loss of water, and a tough, laminated translucent stock results.

Other glycol esters of alpha,beta-unsaturated dicarboxylic acids may be substituted for the esters of the specific examples. The particular choice of glycol used in preparing the resin is governed mainly by the desired physical properties of the intermediate and final polymerization products, especially hardness, impact resistance, distensibility, refractive index, adhesion, compatibility, etc. Thus, ethylene glycol, diethylene glycol, propylene glycol, dipropylene glycol, butylene glycol, dibutylene glycol, isopropylene glycol, etc. may be selected for esterification with the unsaturated acid. Obviously, various mixtures of these glycols can be used where expedient.

Alpha,beta-unsaturated dicarboxylic acids other than maleic and fumaric acids which may be esterified with any of the above or similar glycols include itaconic acid, citraconic acid, mesaconic acid, etc. Obviously, various mixtures of these acids can be used where expedient.

The particular glycol ester chosen for copolymerization with p-isopropenyl toluene must be initially soluble in aromatic hydrocarbons. In order to achieve this solubility the resin may, if necessary, be modified with other substances which are normally used in the preparation of alkyd resins. These modifying substances include monohydric alcohols, polyhydric alcohols, monobasic acids and dibasic acids, both of the aliphatic and aromatic series. For instance, I have found that satisfactorily soluble unsaturated resins may be obtained by including in the formulation of the resin long-chain aliphatic glycols or shorter chain branched-chain glycols. Similarly, resins containing polyhydric alcohols such as glycerol, long-chain monobasic acids such as undecylenic acid and hydroxydecanoic acid, and/or monohydric alcohols such as cetyl and hydrogenated abietyl alcohols, etc., are suitable.

I have found that cured resins of the optimum physical properties can be obtained only from compositions containing from about 70–80 parts by weight of unsaturated resin, i. e., glycol ester of alpha,beta-unsaturated dicarboxylic acid, and from about 30–20 parts by weight of p-isopropenyl toluene. Such compositions of optimum ratio when allowed to cure out of the mold do not undergo crazing, the p-isopropenyl toluene being continuously used up. This behavior is in marked contrast to that of compositions containing a 50:50 ratio. The 50:50 mixtures are often incompatible, they fail to harden satisfactorily, and the excess p-isopropenyl toluene which remains dispersed in the resin mass causes distortion, cracking and crazing on standing.

Although polymerization catalysts are not required they may be utilized if desired in order to speed up the reaction. Examples of suitable catalysts include hydrogen peroxides; organic peroxides such as benzoyl peroxide, phthalic peroxide, succinic peroxide, acetyl benzoyl acetic peroxide, etc.; fatty oil acid peroxides such as coconut oil peroxides, stearic peroxide, oleic peroxide, etc.; alcohol peroxides such as tertiary butyl peroxide, etc.; and terpene oxides such as ascaridole, etc. The peroxide has a temporary inhibiting effect in the first stages of the reaction but behaves as an accelerator in the latter stages.

Temperatures as low as room temperature, i. e., about 30° C., and as high as about 200° C. may be used. The optimum temperature is about 120° C.

The insoluble resins of the present invention may be prepared by polymerizing mixtures of p-isopropenyl toluene and unsaturated resins in the proper proportions as such, in solution, in emulsion, in dispersion, or in various combinations of these phases.

Suitable plasticizers may be incorporated into my polymeric materials in order to produce products of varying degrees of flexibility. Particularly suitable plasticizers are dibenzyl phthalate, benzyl phenyl aminoacetonitrile, naphthyl alpha-hydroxy isobutyric acid, the alpha-naphthyl methyl and other esters of alpha-hydroxy isobutyric acid, chlorinated rubber, ethyl lactate, tricresyl phosphate, etc.

A minor portion, i. e., up to about 10% by weight, of the glycol ester of the alpha,beta-unsaturated dicarboxylic acid may be replaced by other polymerizable materials including acrylonitrile, acrylic acid, methacrylic acid, amides and esters of acrylic and methacrylic acids, styrene, acrolein, methacrolein, etc.

It is an advantage of the present invention that the copolymers obtained thereby from p-isopropenyl toluene and an unsaturated resin may be cured at elevated temperatures with little tendency to inhibition by aerial oxidation.

It is another advantage of the present invention that polymerization catalysts and/or inhibitors are unnecessary and, in the case of the inhibitors, are not only unnecessary but without effect. For this reason the copolymers of the present invention are admirably suited for application to substances such as wood which contains a natural inhibitor or to substances such as rubber to which an anti-oxidant has been added. Other polymerizable or copolymerizable compositions which contain polymerization catalysts and/or inhibitors are utilized with difficulty in connection with materials such as wood and rubber because they are susceptible to the effect of the inhibitor in the wood or rubber. This difficulty is not encountered with the resins of the present invention because they are unaffected by inhibitors.

A further advantage of the present invention resides in the fact that an intermediate polymeric stage exists where the resin may be said to be case hardened and can thus be removed from the container or mold and formed into any desired shape before final curing. Thus, the resins may be cast into tubes, rods, sheets and other special shapes or cast tubes, rods and sheets may be sawed, cut or machined into special shapes.

It is a further advantage of the present invention that laminated structures utilizing the resinous compositions of the present invention can readily be assembled and that lower than usual pressures may be used in the curing operation. Moreover, the laminated structures may be shaped during the curing operation.

If perfectly light colored products are not required, crude p-isopropenyl toluene may be employed. Such a product contains usually about 90–98% of p-isopropenyl toluene together with hydrocarbon impurities and possible traces of formaldehyde and p-methyl acetophenone resulting from oxidation of the hydrocarbon. If very high grade products are desired, any color contained in the crude p-isopropenyl toluene may be removed by treatment with a 5–10% solution of an alkali such as sodium hydroxide followed by steam distillation over alkaline water. Satisfactory decolorization may sometimes be obtained by steam distillation alone without the previous alkali treatment.

Various pigments and dyes such as Sudan IV, Nigrosine, iron oxide, ultramarine, Prussian Blue, titanium dioxide, zinc oxide, etc., may be incorporated in my compositions.

Similarly, if desired, fillers, i. e., wood flour, wood fiber, paper fiber, dust clay, zein, glass wool, glass cloth, mica, granite, dust silk flock, cotton flock, steel wool, silicon carbide, paper, cloth, sand, etc., may be incorporated with the polymerizable mixture or the finished copolymer.

The polymerizable compositions of the present invention may be utilized in conjunction with other resinous and plastic products such as urea- and melamine-formaldehyde resins, phenolic resins, nitrocellulose, etc., particularly if a coating composition is desired.

I claim:

1. A polymerizable composition consisting of, as sole polymerizable ingredients, about 70–80% of an unsaturated alkyd resin which is a glycol ester of an alpha, beta-unsaturated dicarboxylic acid and about 30–20% of p-isopropenyl toluene.

2. A copolymer of a composition consisting of, as sole polymerizable ingredients, about 70–80% of an unsaturated alkyd resin which is a glycol ester of an alpha,beta-unsaturated dicarboxylic acid and about 30–20% of p-isopropenyl toluene.

3. A copolymer according to claim 2 in which the glycol ester of an alpha,beta-unsaturated dicarboxylic acid is dipropylene glycol maleate.

4. A copolymer according to claim 2 in which the glycol ester of an alpha,beta-unsaturated dicarboxylic acid is butylene glycol fumarate.

5. A process which comprises heating the polymerizable composition of claim 1 whereby a high molecular weight copolymer which is insoluble in organic solvents of the aromatic hydrocarbon type is obtained.

EDWARD L. KROPA.

REFERENCES CITED

The following references are of record in the file of this patent:

UNITED STATES PATENTS

| Number | Name | Date |
| --- | --- | --- |
| 2,258,423 | Rust | Oct. 7, 1941 |
| 2,361,019 | Gerhart | Oct. 24, 1944 |
| 2,369,689 | Robie et al. | Feb. 20, 1945 |
| 2,408,690 | Seymour | Oct. 1, 1946 |
| 2,453,665 | Kropa | Nov. 9, 1948 |
| 2,477,791 | Foster et al. | Aug. 2, 1949 |
| 2,498,621 | Kropa et al. | Feb. 21, 1950 |